Peter Palmlund. Impd. Device for Transmitting Motion

116745    PATENTED JUL 4 1871

Witnesses,
Fred Haynes
R. I. Rabiere

P. Palmlund

UNITED STATES PATENT OFFICE.

PETER PALMLUND, OF BROOKLYN, NEW YORK.

IMPROVEMENT IN DEVICES FOR TRANSMITTING MOTION.

Specification forming part of Letters Patent No. 116,745, dated July 4, 1871.

*To all whom it may concern:*

Be it known that I, PETER PALMLUND, a subject of the crown of Sweden, but now residing at Brooklyn, in the county of Kings and State of New York, have invented a new and useful Improvement in Devices for Transmitting Motion, of which the following is a full, clear, and exact description, reference being had to the accompanying drawing forming part of this specification, and in which—

Figure 1:
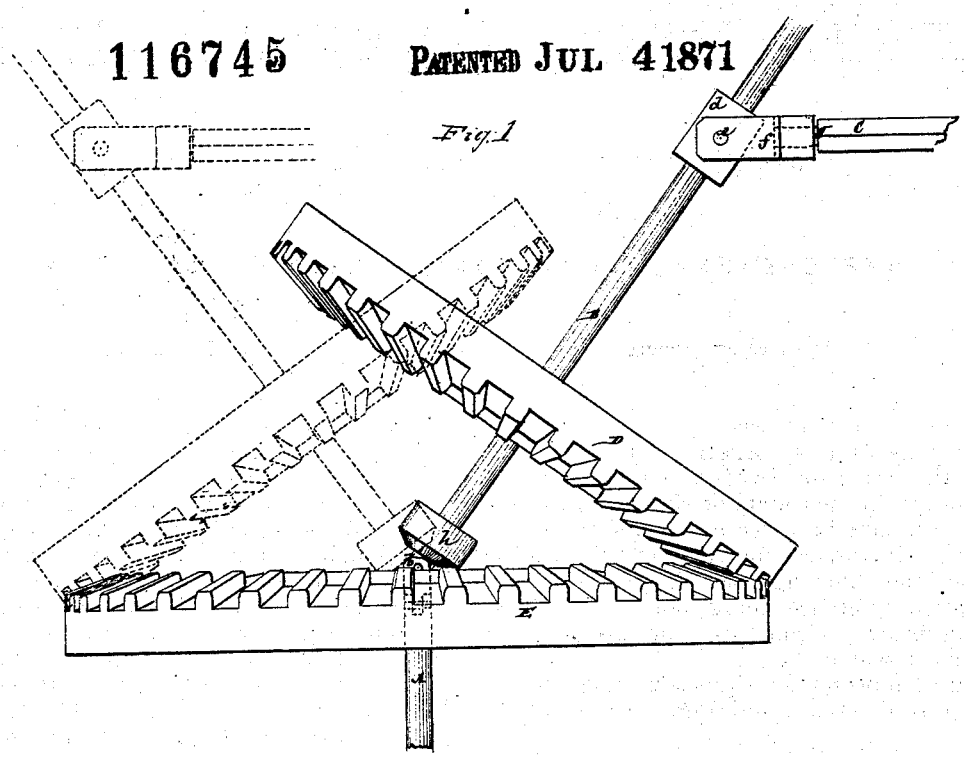
Figure 2:
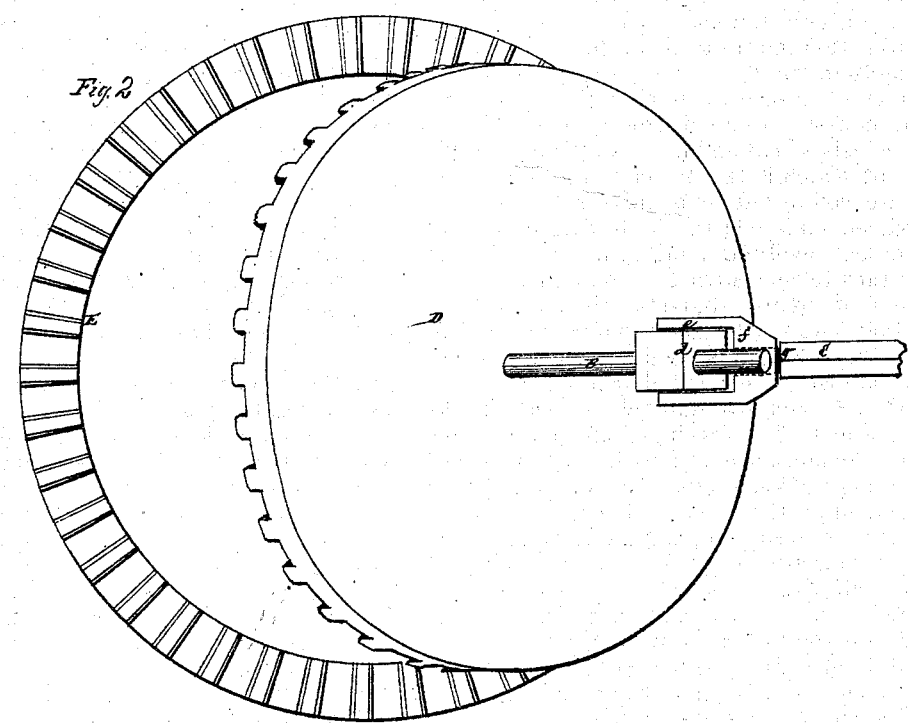

Figure 1 represents a side view or elevation of my improved device, and Fig. 2 a plan of the same.

Similar letters of reference indicate corresponding parts in both figures.

My invention relates to means for transmitting rotary motion, at a diminished velocity, from one shaft to another, or for converting a rapid reciprocating motion into a slow rotary one. The invention consists in a combination with two shafts, the one of which is the driver to the other, and which are connected by a universal joint, of a bevel-wheel, made fast to the driving-shaft, that has a conical revolving motion, and a stationary circular rack in concentric relation with the other shaft and of greater diameter than the bevel-wheel that gears with and revolves around it, whereby the one shaft is made to rotate the other with a diminished velocity, dependent upon the difference between the number of teeth in the rack and wheel. The driving-shaft has its conical revolving motion given to it and the wheel its revolving motion around the rack by a pitman in jointed connection with said shaft.

Referring to the accompanying drawing, A represents a vertical shaft to be rotated at a diminished velocity from a shaft, B, with which it is connected by a universal joint, $b$, at the adjacent ends of said shafts. This driving-shaft B is operated by a pitman, C, which receives its motion from the reciprocating piston of an engine, or otherwise, and is connected with said shaft by a sleeve, $d$, pivoted, as at $e$, to a jaw, $f$, that in its turn is pivoted, in transverse relation with the pivot $e$, as at $g$, to the end of the rod C. Said shaft B carries a bevel-wheel, D, which gears with a fixed circular rack, E, that is in concentric relation with the shaft A. The shaft B has two motions—that is to say, a rotating motion on its axis and a conical revolving one from the universal joint $b$ as a center—the wheel D traveling around the stationary rack E and the shaft B preferably being supported or steadied near its lower end by a circular boss or runner, $h$, arranged to run on the upper face of the rack, around or in proximity to its eye. The wheel D is of smaller diameter, or has a less number of teeth in it, than the rack E, and as the difference in number of teeth in the wheel and rack is to the whole number of teeth in the wheel so will be the number of conical revolutions made by the shaft B and revolutions of the wheel around the rack to each one rotation of the shaft A. Thus, if the rack E has forty-one (41) teeth in it and the wheel D thirty-five (35) teeth, which gives a difference of six (6) teeth, then will it require five and five-sixths ($5\frac{5}{6}$) conical revolutions of the shaft B and revolutions of the wheel around the rack to produce one rotation of the shafts A and B on their respective axes. In this way, although the two shafts are tied or jointed together, the shaft A has a diminished velocity communicated to it from the more rapid conically-revolving shaft B or rapid reciprocating motion of the pitman C.

What is here claimed, and desired to be secured by Letters Patent, is—

1. The combination, with the shafts A and B, jointed together as described and the latter of which has a conical revolving motion in addition to a rotating one on its axis, of the wheel D and fixed circular rack E having an equal number of teeth in them, substantially as specified.

2. The pitman C, and sleeve $d$ connected therewith by universal-joint, in combination with the universally-jointed or attached shafts A and B, the wheel D, and stationary rack E of unequal diameters, essentially as herein set forth.

3. The circular boss or runner $h$ at the foot of the conically-revolving shaft B, in combination with the wheel D, the fixed circular rack E, and the shafts A and B, substantially as specified.

P. PALMLUND.

Witnesses:
FRED HAYNES,
R. E. RABEAU.